343-754
SEARCH ROOM

June 7, 1966 C. H. WALTER ETAL 3,255,454

SURFACE WAVE LUNEBERG LENS ANTENNA SYSTEM

Filed Feb. 6, 1964 5 Sheets-Sheet 1

Inventors
Carlton H. Walter
Roger C. Rudduck
By Anthony D. Cennamo

Inventors
Carlton H. Walter
Roger C. Rudduck
By Anthony D. Cennamo

June 7, 1966 C. H. WALTER ETAL 3,255,454

SURFACE WAVE LUNEBERG LENS ANTENNA SYSTEM

Filed Feb. 6, 1964

5 Sheets-Sheet 3

Inventors

Carlton H. Walter

Roger C. Rudduck

By Anthony D. Cennamo

SURFACE WAVE LUNEBERG LENS ANTENNA SYSTEM

Filed Feb. 6, 1964 5 Sheets-Sheet 4

Inventors
Carlton H. Walter
Roger C. Rudduck
By Anthony D. Cennamo

SURFACE WAVE LUNEBERG LENS ANTENNA SYSTEM

Filed Feb. 6, 1964 5 Sheets-Sheet 5

INVENTOR.
CARLTON H. WALTER
BY ROGER C. RUDDUCK
Anthony D. Cennamo

United States Patent Office 3,255,454

Patented June 7, 1966

3,255,454

SURFACE WAVE LUNEBERG LENS ANTENNA SYSTEM

Carlton H. Walter, 3828 Mountview Road, and Roger C. Rudduck, 1217 Mulford Road, both of Columbus 21, Ohio Filed Feb. 6, 1964, Ser. No. 343,916
6 Claims. (Cl. 343—754)

This application is a continuation-in-part of application Serial Number 79,435, now abandoned.

This invention relates to Luneberg lens antennas and particularly to a surface-wave Luneberg lens antenna wherein the direction of the radiated beam with respect to the plane of the lens rim is controlled.

As a result of basic theoretical work by R. K. Luneberg, on the optics in a medium of variable index of refraction, there resulted in a type of lens that has many applications in micro-wave antennas. Luneberg showed that if a dielectric sphere of unit radius has an index of refraction $n$ satisfying the relation $$n=\sqrt{2-r^2}$$

where $r$ is the distance from the center of the sphere, then a plane wave incident on the sphere would focus at a point on the surface of the sphere diametrically opposite from the incident plane wave.

Many recent studies and publications have been completed on microwave structures of both spherical and cylindrical shapes having the radial variation in $n$ given by the above equation. Emphasis has been placed on techniques for obtaining the necessary radial variation in $n$, as well as on modifications and applications. The electromagnetic theory of the Luneberg lens is considered by R. Jasik, "The Electromagnetic Theory of the Luneberg Lens," Report TR 54–121, Air Force Cambridge Research Center, Bedford, Mass., November 1954, for the cylindrical lens and by C. H. Wilcox, "The Refraction of Plane Electromagnetic Waves by a Luneberg Lens," Report MSD 1802, Lockheed Aircraft Corporation, Van Nuys, California, June 1956, and C. T. Tai, "The Electromagnetic Theory of the Spherical Luneberg Lens," Report 667–17, The Ohio State University Research Foundation, Columbus, Ohio, August 1956, for the spherical lens. Jasik solved for the far field of the cylindrical lens and obtained numerical results for both omnidirectional and dipole sources. Jasik found good agreement between the results of his exact solution and the results he obtained by optical methods for a lens diameter as small as three wave-lengths. Wilcox solved for the fields at or near the focus for a plane wave incident on a spherical lens. Tai's solution for the spherical lens is more general; it can be used to find the far field with excitation at the focus or the field near the focus for a plane wave incident on the lens. Recent work by E. H. Braun, "Radiation Characteristics of the Spherical Luneberg Lens," "IRE Transactions on Antennas and Propagation," volume AP–4, No. 2, April 1956, on the spherical Luneberg lens gives the beam width, gain and side lobe level of the far-field pattern for various distributions of electric and magnetic fields over the surface of the lens.

Another basic study that has been applied to microwave antennas recently is that of surface-wave propagation. An electromagnetic surface wave can be defined as an electromagnetic wave that propagates along an interface between two media, such as that formed by the structure and free space. The earliest work on this subject appears to be that of A. Sommerfeld, "Fortpflanzung Electrodynamischer Wellen an Einem Zykindrischen Leiter," Ann. Phys. U. Chemie, vol. 67, p. 233, 1899, who discussed the propagation of a transverse magnetic surface wave along an infinitely long cylindrical wire of finite conductivity. Important contributions have been made by C. C. Cutler with his work on electromagnetic waves guided by corrugated conducting surfaces, G. Goubau, "Surface Waves and Their Applications to Transmission Lines," Journal of Applied Physics, volume 21, 1950, p. 1119, with his work on electromagnetic waves guided by a dielectric coated wire, and S. S. Atwood with his work on "Surface-Wave Propagation over a Coated Plane Conductor." A good summary and an extensive bibliography on surface waves have been presented by F. J. Zucker in his paper, "The Guiding and Radiation of Surface Waves," Proceedings of the Symposium on Modern Advances in Microwave Techniques, Polytechnic Institute of Brooklyn, N.Y., November 1954.

In our copending application, Serial Number 777,524, filed December 1, 1958, now Patent No. 3,108,278, for "Surface Wave Luneberg Lens Antenna System," we disclosed a surface-wave structure that can be made to perform as a Luneberg lens. In particular, it was shown that the index of refraction of a surface-wave structure can be found by the equation $$\frac{c}{v}=n-\sqrt{2-r^2}$$

where:

$c$=velocity of light in free space
$v$=phase velocity of the surface wave
$r$=is normalized radius It is further shown that a circular dielectric sheet on a ground plane can be made to perform as a Luneberg lens in the plane of the sheet and at the same time perform as an endfire antenna in the orthogonal plane.

In our copending application S.N. 341,493 filed, January 28, 1964, for "Non-planar Surface-Wave Luneberg Lens Antenna," we disclose a surface-wave structure operable as a Luneberg lens although its contour may be other than planar. This antenna adapts the teachings of our prior copending application to more practical applications. That is, the non-planar surface-wave structure may be fitted flush with the skin of the aircraft, vehicle or craft upon which the antenna is to be mounted.

We have found that the surface-wave antenna disclosed in each of our copending applications does have a limitation to its practical utility. This limitation, which is similarly encountered in other prior art Luneberg lens antennas is that the radiated beam must lie in or near the plane of the rim of the lens. Therefore, if the surface-wave structure of either of our two copending applications is fitted directly to a vehicle the radiated beam would only be in the one direction. In many and most instances, the actual structure, upon which the antenna is mounted, will be in the horizontal; consequently, if the beam is confined to be at or near the plane of the lens, the beam radiated will be at or near the horizontal. In practical applications, a radiated beam at most any other angle would be more desired than that in the horizontal.

We disclose in the present invention a surface-wave Luneberg lens similar to the non-planar structure of our copending application, S.N. 341,493 with the improvement of beam steering in the orthogonal plane. That is, we are able to control the angle of the beam radiated by a degree lying between the vertical and the horizontal.

Further, as pointed out in the literature, the Luneberg lens is readily adaptable to 360° scanning. This is accomplished simply by rotating the feed around the rim of the lens in a manner shown in U.S. Patent No. 2,576,182, or by having multiple feeds distributed around the lens. With the improvement of the present invention adapted to the Luneberg lens, we are now able to scan 360° in the horizontal plane and simultaneously vary the radiated beam in an up-and-down direction. It may be preferred of course, in certain applications of the surface-wave Luneberg lens to maintain a fixed direction and also to fix the position of the beam in the orthogonal plane.

With the Luneberg lens it has been found considerably more expedient to rotate a feed around the rim of the lens to obtain 360° scanning than to rotate the entire antenna structure as done with conventional antennas. However, rotating the feed around a lens that is fairly large in size is not accomplished without difficulty. The present invention defines an antenna operable as a Luneberg lens and wherein the feed or feeds need not be at the rim of the lens. If the feed may be placed relatively close to the center of the lens, the radius of the rotation of the feed in 360° scanning is greatly reduced thereby simplifying the entire operation.

Accordingly, it is a principal object of the present invention to provide a new and improved Luneberg lens antenna.

It is another object of the present invention to provide a new and improved Luneberg lens antenna wherein the radiated beam may be controlled.

Still another object of the present invention is to provide a Luneberg lens antenna having a feed reduced in radius from the center of the lens to more effectively and accurately scan the radiated beam 360°.

Another object of the present invention is to provide a Luneberg lens antenna with a controlled radiation beam that is adaptable to either a planar or non-planar surface-wave structure.

A further object of the present invention is to provide a Luneberg lens antenna wherein the radiated beam may be scanned in a direction transverse to the plane of the rim of the lens.

Further objects and features of the present invention will become apparent from the following detailed description when taken in conjunction with the drawings in which.

Figure 8:
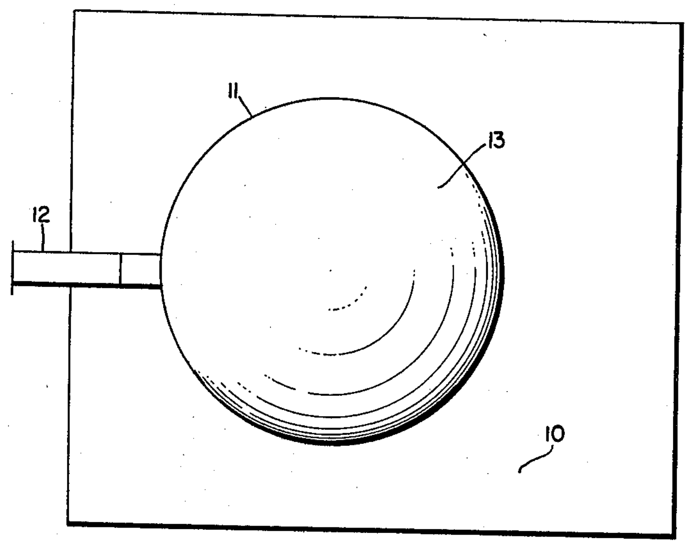
Figure 9:
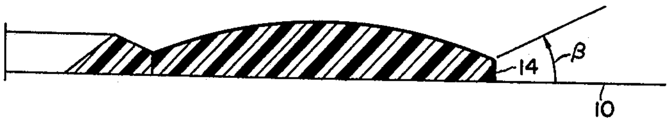
Figure 10:
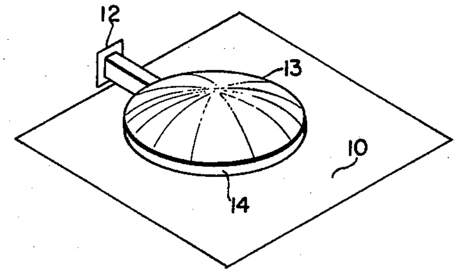
Figure 11:
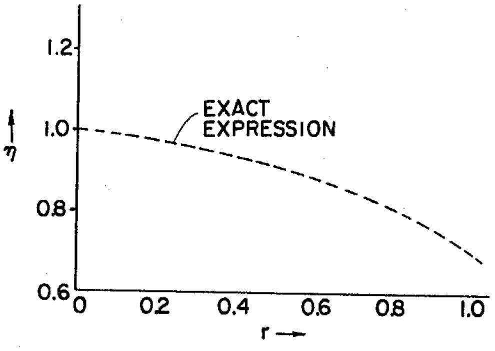
Figure 13:
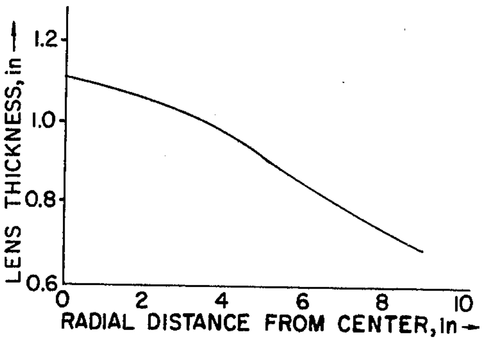
Figure 12:
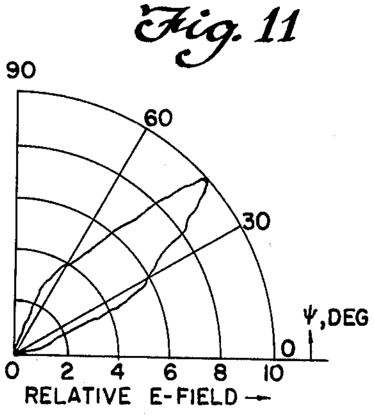
Figure 12A:
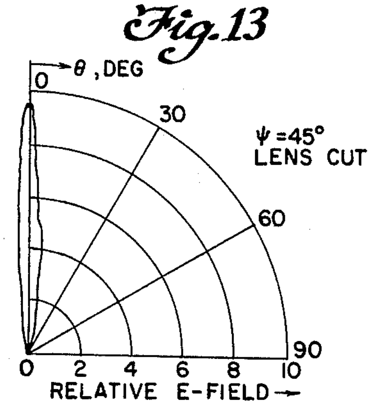
Figure 15:
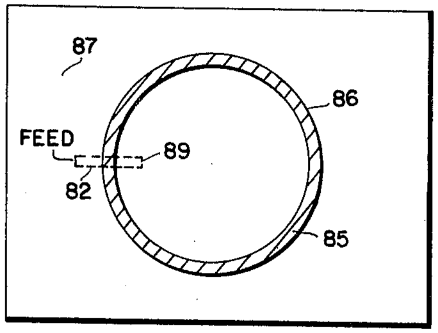
Figure 14:
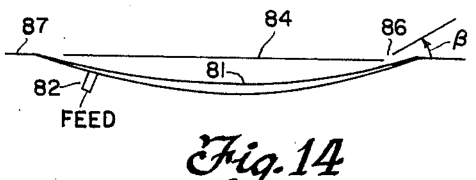
Figure 17:
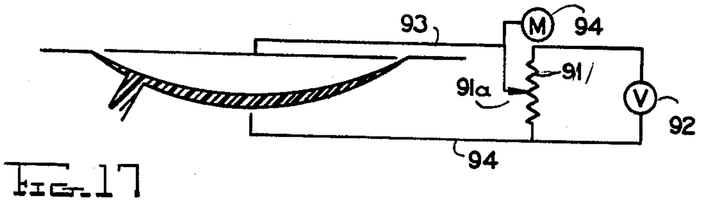
Figure 16:
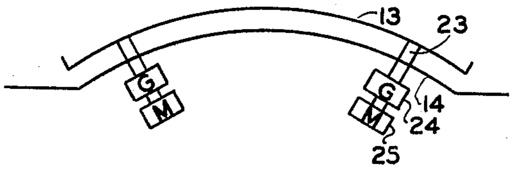
Figure 18:
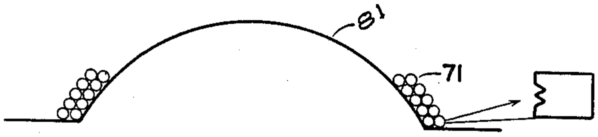
Figures 19, 19A, 19B, 20B:
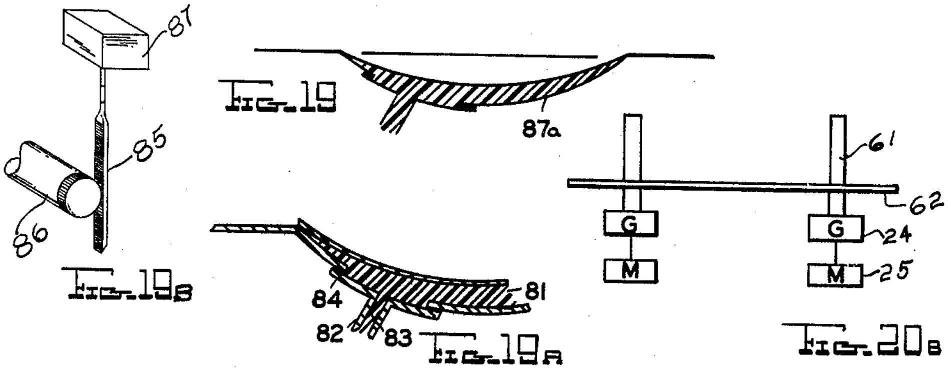
Figure 20:
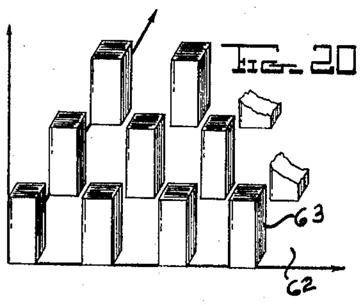
Figure 20A:
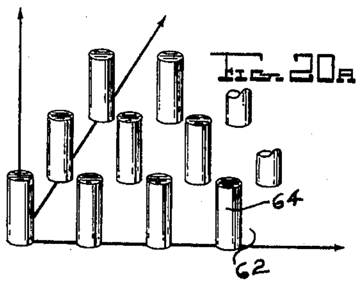

FIG. 8 is a top view schematic illustration of a surface-wave lens antenna incorporating the principles of our invention, FIG. 9 is a cross-sectional view of the schematic illustration of FIG. 8, FIG. 10 is pictorial presentation of one preferred embodiment of our invention, FIG. 11 is a graph illustrating the index variation for a rim radiating lens focussed at $\beta=45°$, FIGS. 12 and 12*a* are measured radiation patterns taken from tests of a constructed embodiment of the invention, FIG. 13 is a graph illustrating the variation of plate spacing for a planar lens for purposes of varying the radiated beam angle, FIG. 14 is a cross-sectional view of a flush-mounted rim-radiating surface-wave lens also embodying the principles of our invention, and, FIGURE 15 is a top view of the flush mounted lens of FIGURE 14;

FIGURE 16 is a cross-sectional view of parallel plate structure with means for varying the spacing therebetween;

FIGURE 17 is the flush mounted antenna having means for varying the electric field in the ferroelectric material comprising the lens;

FIGURE 18 is the flush mounted antenna having means for varying the magnetic field in the ferromagnetic material comprising the lens;

FIGURE 19 is the flush mounted antenna having means for varying the position of the feed; and FIGURE 19*a* is an enlarged view of the feed section of FIGURE 19; and FIGURE 19*b* illustrates a mechanical means for varying the position of the feed;

FIGURES 20 and 20*a* are illustrations of the metal posts surface-wave structure; and FIGURE 20*b* is means for varying the structure.

Figure 1:
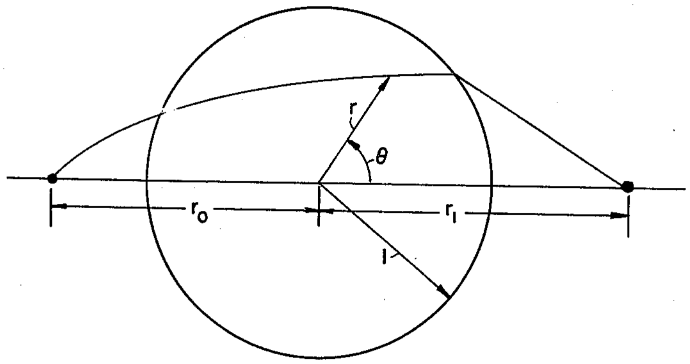
FIG. 1 is a schematic illustration of the typical ray path in a Luneberg lens with two external foci.

In the conventional Luneberg lens, the index of refraction of a radially symmetric lens has the optical property the rays from one focal point are focused to the other focal point. Shown in FIG. 1 is the conventional Luneberg lens of unit radius with external foci at $r_0$ and $r_1$. The index is given by $$n=\exp\left[w(p,r_0)+w(p,r_1)\right] \tag{1}$$

where $$w(p,c)=\frac{1}{\pi}\int_p^1 \frac{\sin^{-1}\frac{k}{c}}{\sqrt{K^2-p^2}}dK \tag{2}$$

and $$p=nr \tag{3}$$

The most significant case is that for which $r_0=1$ and $r_1=0$ and $w(p,1)=\frac{1}{2}\ln(1+\sqrt{1-p^2})$, the index reduces to $$n=\sqrt{2-r^2} \tag{4}$$

Morgan, General Solution of the Luneberg Lens Problem, J. Appl. Phys., vol. 29, pp. 1358–1368, September 1958, extended Luneberg's analysis to a lens with an outer shell of arbitrary index where one focus is external and the other focus is either external or internal. The rays of these types of lenses all lie in the plane of the lens.

Figure 2:
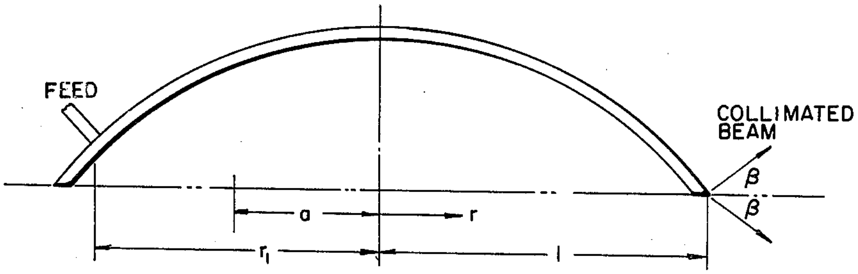
FIG. 2 is a cross sectional view schematic illustration of a non-planar two-dimensional lens having the radiated beam at an angle $\beta$.
Figure 3:
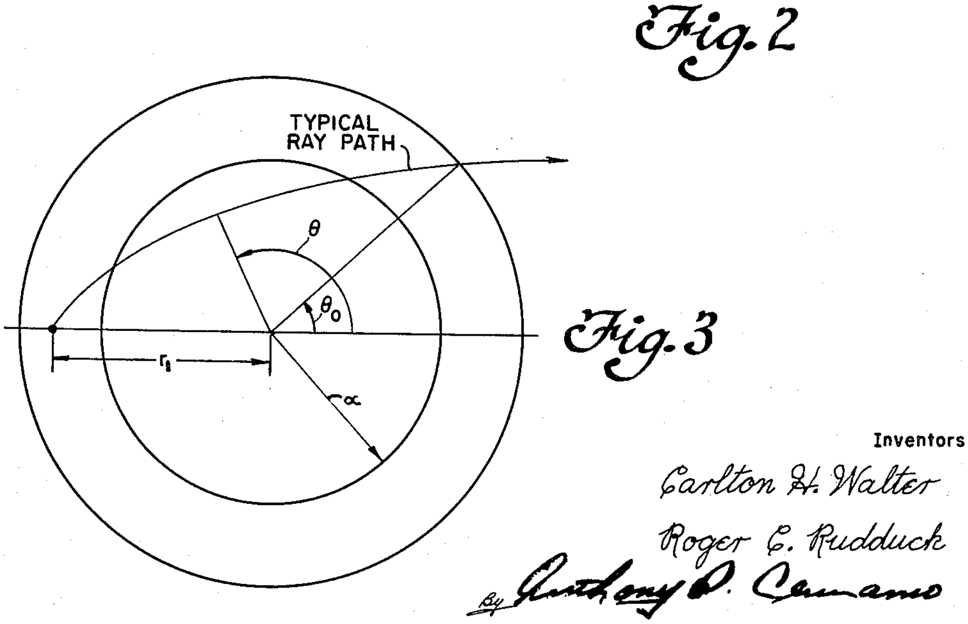
FIG. 3 is a top view of the schematic illustration shown in FIG. 2.

The present invention is an improvement over that of the conventional Luneberg lens and that of Morgan. Generally, an antenna has been designed that comprises a radially symmetric lens of arbitrary contour which focuses rays from an internal point into a collimated beam in a direction diametrically opposite the focus and at an angle $\beta$, with respect to the plane of the rim of the lens. Referring now to FIGS. 2 and 3, the index of refraction is radially symmetric and is arbitrary in an outer annulus, $\alpha\leq r\leq 1$, containing the focus. In the central portion the index depends on the lens contour, the angle $\beta$, the index of the outer annulus, and the radius of the focus.

It has been found that the index may be derived for a general lens contour when the beam angle, feed radius and contour are specified, or the contour may be derived if the index, beam angle and feed radius are specified. In a typical embodiment the index is solved explicitly for the case where the contour of the lens, the feed radius and the beam angle are specified.

As seen from FIG. 3, the path length of a ray from the rim of the lens to $\infty$ is $$L=\int n\,dl=\int \cos\beta\sqrt{r^2+\left(\frac{dr}{d\theta}\right)^2}d\theta=\int f\left(\beta,r,\frac{dr}{d\theta}\right)d\theta \tag{5}$$

By Fermat's principle the path L is a path of least time. From the calculus of variations there is obtained for a region of radial symmetry an Euler equation of the form $$(6)\qquad f=\frac{dr}{d\theta}\frac{\partial f}{\partial\left(\frac{dr}{d\theta}\right)}=K=nr\sin\phi$$

where $\phi$ is the angle between the ray path and the radius vector, and K corresponds to an individual ray path.

From Eqs. 5 and 6, $$(7)\qquad K=\frac{r^2\cos\beta}{\sqrt{r^2+\left(\frac{dr}{d\theta}\right)^2}}$$

Solving Eq. 7 with respect to $d\theta/dr$ gives $$(8)\qquad \frac{d\theta}{dr}=-\frac{K}{r\sqrt{r^2\cos^2\beta-K^2}}$$

Integrating gives $$(9)\qquad \theta_0=\frac{K}{\cos\beta}\int_1^\infty\frac{dr}{r\sqrt{r^2-(K/\cos\beta)^2}}$$

Integral tables yield $$(10)\qquad \theta_0=\left[\cos^{-1}\frac{K/\cos\beta}{r}\right]_1^\infty=\sin^{-1}\frac{K}{\cos\beta}$$

From Eq. 10 it can be seen that the angle traversed by the ray after leaving the lens is $\sin^{-1} K/\cos\beta$.

Inside the lens the path length is given by $$(11)\qquad L=\int f\left(r,\frac{dr}{d\theta},\frac{dz}{d\theta}\right)d\theta=\int n(r)\sqrt{r_2+\left(\frac{dr}{d\theta}\right)^2+\left(\frac{dz}{d\theta}\right)^2}\,d\theta$$

where $z$ is a function of radius which determines the lens configuration. The function $$f\left(r,\frac{dr}{d\theta},\frac{dz}{d\theta}\right)$$

also must satisfy Eq. 6, giving $$(12)\qquad K=\frac{nr^2}{\sqrt{r^2+[1+\dot z^2]\left(\frac{dr}{d\theta}\right)^2}}$$

where $\dot z=dz/dr$.

Solving for $d\theta/dr$ gives $$(13)\qquad \frac{d\theta}{dr}=\pm\frac{K\sqrt{1+\dot z^2}}{r\sqrt{p^2-K^2}}$$

where $p=n(r)r$. Integration yields the angle traversed by the ray inside the lens, $$(14)\qquad K\int_{r_*}^{r_1}\frac{\sqrt{1+\dot z^2}}{r\sqrt{p^2-K^2}}dr+K\int_{r_*}^{1}\frac{\sqrt{1+\dot z^2}}{r\sqrt{p^2-K^2}}dr=\pi-\theta_0$$

where:

(15) $r_*$=minimum radius of ray path corresponding to a value K
$r_1$=radius of internal focal point.

The index of the outer annulus is arbitrary subject to the condition $$(16)\qquad p(r)=P(r)\geq\cos\beta.\alpha\leq r\leq 1$$

Combining Eqs. 10 and 14, $$(17)\qquad 2K\int_{r_*}^{\alpha}\frac{\sqrt{1+\dot z^2}}{r\sqrt{p^2-K^2}}dr=\pi-\sin^{-1}\frac{K}{\cos\beta}-2K\int_{\alpha}^{r_1}\frac{\sqrt{1+\dot z^2}}{r\sqrt{p^2(r)-K^2}}dr-K\int_{r_1}^{1}\frac{\sqrt{1+\dot z^2}}{r\sqrt{p^2(r)-K^2}}dr$$

Equation 17 may be solved either for the index $n$ for a specified contour or the contour for a specified $n$. An additional condition on $p(r)$ is obtained from Eq. 17 by requiring that the ray corresponding to $K=\cos\beta$ not be refracted through so great an angle that it cannot leave the lens at $\theta=\theta_0$. That is, $$(18)\qquad \frac{\pi}{2}\geq 2\cos\beta\int_{\alpha}^{r_1}\frac{\sqrt{1+\dot z^2}}{r\sqrt{p^2(r)-\cos^2\beta}}dr+\cos\beta\int_{r_1}^{1}\frac{\sqrt{1+\dot z^2}}{r\sqrt{p^2(r)-\cos^2\beta}}dr$$

To solve Eq. 17 for $n$, let $$(19)\qquad G'(p)dp=-\sqrt{1+\dot z^2}\frac{dr}{r}$$

thus Eq. 17 becomes $$(20)\qquad 2K\int_{\cos\beta}^{K}\frac{G'(p)dp}{\sqrt{p^2-K^2}}=\pi-\sin^{-1}\frac{K}{\cos\beta}-2K\int_{\alpha}^{r_1}\frac{\sqrt{1+\dot z^2}}{r\sqrt{p^2(r)-K^2}}dr=-K\int_{r_1}^{1}\frac{\sqrt{1+\dot z^2}}{r\sqrt{p^2(r)-\alpha^2}}dr$$

Replacing $p$ by $\sigma$, multiplying both sides of Eq. 20 by $(K^2-p^2)^{-1/2}$, and integrating with respect to K gives $$(21)\qquad \int_p^{\cos\beta}\left[\int_{\cos\beta}^{K}\frac{KG'(\sigma)}{\sqrt{(\sigma^2-K^2)(K^2-p^2)}}d\sigma\right]dK=\frac{\pi}{2}\int_p^{\cos\beta}\frac{dK}{\sqrt{K^2-p^2}}-\frac{1}{2}\int_p^{\cos\beta}\frac{\sin^{-1}\frac{K}{\cos\beta}}{\sqrt{K^2-p^2}}dK-\int_p^{\cos\beta}\left[\int_{\alpha}^{r_1}\frac{K\sqrt{1+\dot z^2}}{\sqrt{P^2(r)-K^2}}\frac{dr}{r}\right]\frac{dK}{\sqrt{K^2-p^2}}-\frac{1}{2}\int_p^{\cos\beta}\left[\int_{r1}^{1}\frac{K\sqrt{1+\dot z^2}}{\sqrt{P^2(r)-K^2}}\frac{dr}{r}\frac{dK}{\sqrt{K^2-p^2}}\right.$$

Letting $K/\cos\beta=g$, $dK=\cos\beta dg$ and using the integral defined in Reference 1 as $$(22)\qquad w(p,s)=\frac{1}{\pi}\int_p^1\frac{\sin^{-1}\frac{K}{s}}{\sqrt{K^2-p^2}}dk,\ 0\leq p\leq 1,\ s\geq 1$$

then $$(23)\qquad \frac{1}{\pi}\int_p^{\cos\beta}\frac{\sin^{-1}\frac{K}{\cos\beta}}{\sqrt{K^2-p^2}}dK=\frac{1}{\pi}\int_{\frac{p}{\cos\beta}}^{1}\frac{\sin^{-1}g}{\sqrt{g^2=\left(\frac{p}{\cos\beta}\right)^2}}dg=w\left(\frac{p}{\cos\beta}\cdot 1\right)=\frac{1}{2}\ln\left[1+\sqrt{1-\left(\frac{p}{\cos\beta}\right)^2}\right]$$

Let $$(24)\qquad \Omega(p)=\frac{2}{\pi}\int_p^{\cos\beta}\left[\int_{\alpha}^{r1}\frac{K\sqrt{1+\dot z^2}}{\sqrt{P^2(r)-K^2}}\frac{dr}{r}\right]\frac{dK}{\sqrt{K^2-p^2}}+\frac{1}{\pi}\int_p^{\cos\beta}\left[\int_{r1}^{1}\frac{K\sqrt{1+\dot z^2}}{\sqrt{P^2(r)-K^2}}\frac{dr}{r}\right]\frac{dK}{\sqrt{K^2-p^2}}$$

The first integral on the right side of Eq. 21 is evaluated as $$(25)\qquad \int_p^{\cos\beta}\frac{dK}{\sqrt{K^2-p^2}}=\ln\frac{\cos\beta+\sqrt{\cos^2\beta-p^2}}{p}$$

Changing the order of integration on the left side of Eq. 21 gives $$(26)\qquad \int_p^{\cos\beta}\int_{\cos\beta}^{K}\frac{KG'(\sigma)}{\sqrt{(\sigma^2-K^2)(K^2-p^2)}}d\sigma dK=\int_{\cos\beta}^{p}\int_p^{\sigma}\frac{KdK}{\sqrt{(\sigma^2-K^2)(K^2-p)}}G'(\sigma)d\sigma$$

Since

(27)
$$\int_{p}^{\sigma}\frac{KdK}{\sqrt{(\sigma^2-K^2)(K^2-p^2)}}=\frac{\pi}{2}$$

Eq. 21 becomes

(28)
$$G(p)-G(\cos\beta)=\ln\frac{\cos\beta\sqrt{\cos\beta-p^2}}{p}-\ln\left[1+\sqrt{1-\left(\frac{p}{\cos\beta}\right)^2}\right]^{1/2}-\Omega(p)$$

From Eq. 19,

(29)
$$G(p)=\int_{r}^{1}\sqrt{1+\dot{z}^2}\frac{dr}{r}$$

where the upper limit is chosen for convenience.

The lens design procedure may be summarized as follows: Upon specification of $z(r)$ for a given lens contour, $G(p)$ is found from Eq. 29. After specification of $P(r)$ subject to conditions of Eqs. 16 and 18, $\Omega(p)$ can be evaluated from Eq. 24. Equation 28 can then be solved for the index in terms of $p$ by replacing $r$ by $p/n$. Then using $p=nr$, the radius corresponding to index $n$ is found. A similar procedure may be followed in order to find the contour $Z(r)$ when $n$ is specified.

In application of the above defined design procedure the index in a typical embodiment, a spherical cap lens, may be computed. The surface for a spherical cap lens with a cap radius of $a$ is specified by

(30)
$$z=\pm\sqrt{a^2-r^2}$$

and

(31)
$$\dot{z}=\frac{dz}{dr}=\frac{\pm r}{\sqrt{a^2-r^2}}$$

Then Eq. 29 gives

(32)
$$G(p)=\int_{r}^{1}\frac{adr}{r\sqrt{a^2-r^2}}=\left[\ln\frac{r}{a+\sqrt{a^2-r^2}}\right]_{r}^{1}=\ln\frac{a+\sqrt{a^2-r^2}}{r(a+\sqrt{a^2-1})}$$

Equation 28 results in

(33)
$$\ln\frac{a+\sqrt{a^2-r^2}}{r(a+\sqrt{a^2-1}}-\ln\frac{a+\sqrt{a^2-\alpha^2}}{\alpha(a+\sqrt{a^2-1}}=\ln\frac{\alpha(a+\sqrt{a^2-r^2}}{r(a\sqrt{a^2-\alpha^2}}=\ln\frac{\cos\beta\sqrt{\cos^2\beta-p^2}}{p}-\ln\left[1+\sqrt{1-\left(\frac{p}{\cos\beta}\right)^2}\right]^{1/2}-\Omega(p)$$

Solving for $n(p)$,

(34)
$$n=\frac{\cos\beta\,(\cos\beta\,\sqrt{\cos^2\beta-p^2})\,(a+\sqrt{a^2-\alpha^2})^2\,p^2\alpha^2e^{2\Omega}(p)}{2a\alpha\sqrt{\cos\beta}\,(\cos\beta\sqrt{\cos^2\beta-p^2})^{1/2}(a+\sqrt{a^2-\alpha^2})e^{\Omega}(p)}$$

where Eqs. 24 and 31 give

(35)
$$\Omega(p)=\frac{2}{\pi}\int_{\alpha}^{r_1}\int_{p}^{\cos\beta}\frac{KdK}{\sqrt{(P^2(r)-K^2)\,(K^2-p^2)}}\,\frac{adr}{r\sqrt{a^2-r^2}}+\frac{1}{\pi}\int_{r_1}^{1}\int_{p}^{\cos\beta}\frac{KdK}{\sqrt{(P^2(r)-K^2)\,(K^2-p^2)}}$$

$$\frac{adr}{r\sqrt{a^2-r^2}}=\frac{2}{\pi}\int_{a}^{r_1}\tan^{-1}\left[\frac{\cos^2\beta-p^2}{P^2(r)-\cos^2\beta}\right]^{1/2}$$

$$\frac{adr}{r\sqrt{a^2-r^2}}\,\frac{1}{\pi}\int_{r_1}^{1}\tan^{-1}\left[\frac{\cos\beta^2-p^2}{P^2(r)-\cos^2\beta}\right]^{1/2}\frac{adr}{r\sqrt{a^2-r}}$$

and $P(r)$ is subject to the conditions given in Eqs. 16 and 18.

To minimize reflections the index should be continuous throughout the lens and have a value of unity at the rim. This establishes

(36)
$$P(\alpha)=\cos\beta$$

and

(37)
$$P(1)=1$$

One function which satisfies these conditions is

(38)
$$P(r)=\sqrt{\frac{(r-\alpha)^2}{(1-\alpha)^2}\sin^2\beta+\cos^2\beta}$$

then for $r_1=\alpha$,

(39)
$$\Omega(p)=\frac{a}{\pi}\int_{\alpha}^{1}\tan^{-1}\frac{(1-\alpha)\sqrt{\cos^2\beta-p^2}}{\sin\beta\,(r-\alpha)}\,\frac{dr}{r\sqrt{a^2-r^2}}$$

Figure 4:
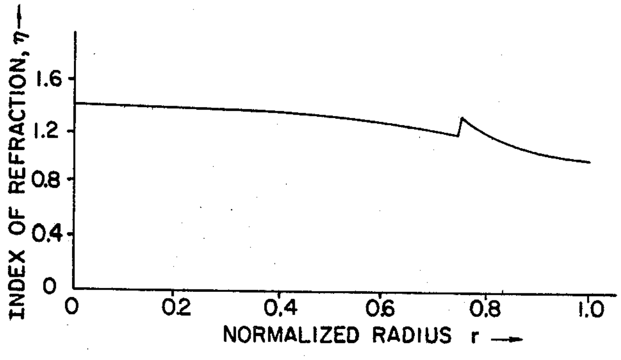
FIG. 4 is a graph illustrating a possible variation of index of refraction versus normalized radius for a spherically contoured lens.

Equation 39 has been numerically integrated for $\alpha=0.75$, $\beta=20°$, and $a=\sqrt{2}$. The resulting index is illustrated in FIG. 4.

In the planar lens which is the special case of the spherical cap lens for which $a\rightarrow\infty$ Equation 34 reduces to

(40)
$$n=\frac{1}{\alpha}\sqrt{\cos\beta}\,(\cos\beta+\sqrt{\cos^2\beta-p^2})^{1/2}e^{-\Omega(p)}$$

and Eq. 35 reduces to

(41)
$$\Omega(p)=\frac{2}{\pi}\int_{\alpha}^{r_1}\tan^{-1}\left[\frac{\cos^2\beta-p^2}{P^2(r)-\cos^2\beta}\right]^{1/2}\frac{dr}{r}+\frac{1}{\pi}\int_{r_1}^{1}\tan^{-1}\left[\frac{\cos^2\beta-p^2}{P^2(r)-\cos^2\beta}\right]^{1/2}\frac{dr}{r}$$

where again $P(r)$ is subject to Eqs. 16 and 18.

The class of planar lenses for which

(42)
$$P(r)=Ar^m=\frac{\cos\beta}{\alpha^m}r^m,\quad m\neq 0$$

will be considered. The coefficient of $r^m$ was chosen such that the index will be continuous at $r=\alpha$.

Evaluating the integrals with respect to $r$ in Eq. 24 by setting $x=r^m$ and $dx=m_r^{m-I}\,dr$ gives

(43)
$$\int_{\alpha}^{r_1}\frac{Kdr}{r\sqrt{A^2r^{2m}-K^2}}+\frac{1}{2}\int_{r_1}^{1}\frac{Kdr}{r\sqrt{A^2r^{2m}-K^2}}=\frac{1}{m}\left[\sin^{-1}\frac{K}{\cos\beta}-\frac{1}{2}\sin^{-1}\frac{K}{r_1n(r_1)}-\frac{1}{2}\sin^{-1}\frac{K}{n(1)}\right]$$

Then

(44)
$$\Omega(p)=\frac{2}{m\pi}\int_{p}^{\cos\beta}\frac{\sin^{-1}\frac{K}{\cos\beta}}{\sqrt{K^2-p^2}}dk-\frac{1}{m\pi}\int_{p}^{\cos\beta}\frac{\sin^{-1}\frac{K}{r_1n(r_1)}}{\sqrt{K^2-p^2}}dK-\frac{1}{m\pi}\int_{p}^{\cos\beta}\frac{\sin^{-1}\frac{K}{n(1)}}{\sqrt{K^2-p^2}}dK$$

Letting $K/\cos\beta=g$, $dg=\cos\beta dK$, and using Eq. 22,

(45)
$$\Omega(p)=\frac{2}{m\pi}\int_{\frac{p}{\cos\beta}}^{1}\frac{\sin^{-1}g}{\sqrt{g^2-(p/\cos\beta)^2}}-\frac{1}{m\pi}\int_{\frac{p}{\cos\beta}}^{1}\frac{\sin^{-1}\frac{g\cos\beta}{r_1n(r_1)}}{\sqrt{g^2-(p/\cos\beta)^2}}dg-\frac{1}{m\pi}\int_{\frac{p}{\cos\beta}}^{1}\frac{\sin^{-1}\frac{g\cos\beta}{n(1)}}{\sqrt{g-(p/\cos\beta)^2}}dg=\frac{1}{m}\left[2w\left(\frac{p}{\cos\beta},1\right)-w\left(\frac{p}{\cos\beta},\frac{r_1n(r_1)}{\cos\beta}\right)-w\left(\frac{p}{\cos\beta},\frac{n(1)}{\cos\beta}\right)\right.$$

To make the index continuous at $r=1$, let $n(1)=1$; then $A=\cos\beta/\alpha m=1$ and the inner radius of the outer shell becomes

(46)
$$\alpha=(\cos\beta)^{1/m}$$

and (47)

$$\Omega(p)=\frac{1}{m}\left[\ln\left(1+\sqrt{1-\left(\frac{p}{\cos\beta}\right)^2}\right)-w\left(\frac{p}{\cos\beta},\frac{r_1n(r_1)}{\cos\beta}\right)-w\left(\frac{p}{\cos\beta},\frac{1}{\cos\beta}\right)\right]$$

Thus for $P(r)=r^m$ and $\alpha=(\cos\beta)^{1/m}$ (48)

$$n=\frac{1}{\alpha}(\cos b)^{(m+2)/2m}\left(\cos\beta+\sqrt{\cos^2\beta-p^2}\right)^{(m-2)/2m}\exp\left\{\frac{1}{m}\left[w\left(\frac{p}{\cos\beta},\frac{r_1n(r_1)}{\cos\beta}\right)+w\left(\frac{p}{\cos\beta},\frac{1}{\cos\beta}\right)\right]\right\}$$

For a planar lens with the focus at the rim and no outer shell (49)

$$r_1=\alpha=1$$

$$\Omega(p)=0$$

and (50)

$$n(r)=\cos\beta\sqrt{2-r^2}$$

Equation 50 corresponds to the index of the well-known Luneberg lens for $\beta=0$ given in Eq. 4.

Figure 5:
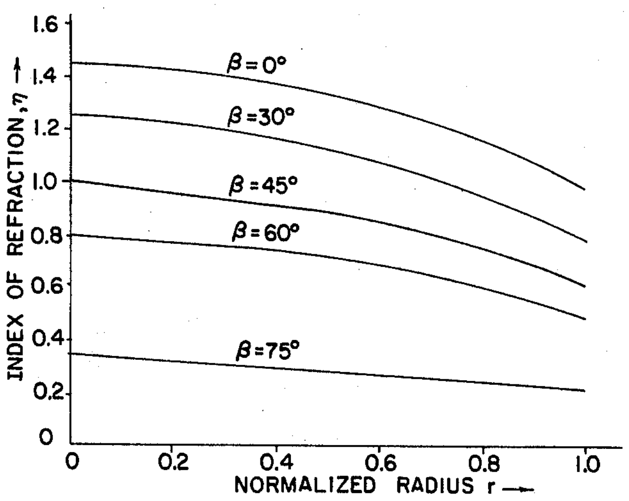
FIG. 5 is a graph illustrating the variation of index of refraction versus normalized radius for a rim-fed planar surface-wave lens for five different beam angles measured from the plane of the lens.

From the above equations, the index for the rimfed planar lenses with no outer shell is plotted for several values of $\beta$ in FIG. 5.

Figures 6, 7:
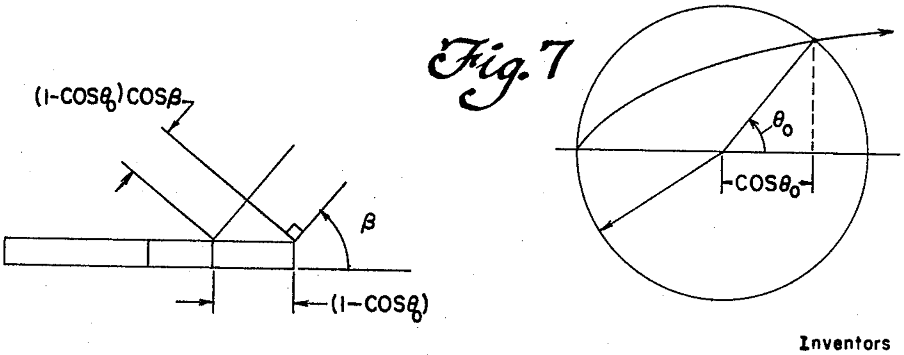
FIG. 6 is a side view schematic illustration of the path length relationship for a rim radiating lens radiating at angle $\beta$.
FIG. 7 is a top view of the schematic illustration of FIG. 6.

As a check on the validity of Eq. 5, the phase around the rim of the lens will be shown to have the correct variation. With reference to FIGS. 6 and 7, the phase variation is such that all path lengths from the focus to the plane at an angle of $(\beta+90°)$ with respect to the plane of the lens are equal. Since $dz/dr=dz/d\theta=0$ for the planar lens, from Eq. 11 the path length in the lens is (51)

$$L=\int_{\theta_0}^{\pi}n\sqrt{r^2+(dr/d\theta)^2}\,d\theta$$

Using Eq. 13 the path length reduces to (52)

$$L=2\int_{r_*}^{1}\frac{n^2r}{\sqrt{p^2-K^2}}dr$$

and substituting the index of Eq. 50, the path length becomes (53)

$$L=2\cos\beta\int_{r^*}^{1}\frac{2r-r^3}{\sqrt{2r^2-r^4-(K/\cos\beta)^2}}dr=\cos\beta\left\{\sqrt{1-(K/\cos\beta)^2}-\sqrt{2r_*^2-r_*^4-(K/\cos\beta)^2}+\sin^{-1}\left(\frac{r_*^2-1}{\sqrt{1-(K/\cos\beta)^2}}\right)\right\}$$

From Eq. 10, $K/\cos\beta=\sin\theta_0$; and from Eq. 6, $$K=n_*r_*=\cos\beta)\sqrt{2r_*^2-r_*^4}$$

because $$\phi=90° \text{ at } r=r_*$$

Then Eq. 53 becomes (54)

$$L=\cos\beta\left(\cos\theta_0+\frac{\pi}{2}\right)$$

As seen from FIGS. 6 and 7 and using Eq. 54, the path length of any ray from the focus up to the plane is

(55) $$L+(1-\cos\theta_0)\cos\beta=\cos\beta(\pi/2+1)$$

Thus the path lengths for all rays are equal resulting in radiation at the angle $\beta$.

Although only the cylindrical lens has been considered, the spherical lens having any radial variation of index as derived here for the planar lenses will radiate a conical beam having a cone angle of $2\beta$.

In the practical consideration of the design equations expressed above, the numerical value of the index or the dielectric constant required becomes less than unity over part or the whole of many of the lenses developed (for example, see Eq. 41). This greatly reduces the methods which can be used to obtain these lenses. For a two-dimensional lens a wave guide supporting the $TE_{10}$ mode has an index given by (56)

$$n=\frac{\lambda}{g}=\sqrt{\epsilon-(\lambda/2d)^2}$$

where

(57) $\lambda$=free-space wavelength
$\lambda_g$=guide wavelength
$\epsilon$=relative dielectric constant of material filling guide, and
$d$=plate spacing.

Thus values of the index less than unity are obtainable. If a three dimensional lens is desired, as with the conventional Luneberg lens, suitable material such as plasmas may be available for dielectric constants less than unity.

With reference to FIGS. 8 and 9, there is shown an embodiment of the Luneberg lens constructed in accordance with the design parameters given above. The lens was designed for TE operation and is a planar lens of the type described by Eq. 50. Essentially, the lens comprised a two-part sandwich structure made up of ground plane 10 and cover plate 13. The top plate 13 was formed from aluminum sheet stock so that its contour matches that of the lens. Electromagnetic energy having a wavelength of the order of 3.1 cm. was fed to the lens through feed 12. The constructed embodiment of the invention of FIGS. 8 and 9 is also shown in perspective in FIG. 10. One side of the dielectric 14 is flat and lies against the ground plane 10. The other side is contoured in accordance with Eq. 58 as is the lower side of the cover plate 13. The principal vertical beam pattern, referring now to FIGS. 12 and 12*a*, has a half power beam width of 18°. The pattern taken perpendicular to the vertical beam pattern and at 45° with respect to the ground plane is also shown by FIGS. 12 and 12*a* and has a half-power beam width of 5° and a sidelobe level of about −18 db.

The index was varied by means of plate spacing. Thus combining Eqs. 50 and 56 gives (58)

$$d=\frac{\lambda}{2\sqrt{\epsilon-\cos^2\beta(2-r^2)}}$$

The plate spacing as a function of radius is shown in FIG. 12.

Another alternative embodiment of the present invention may be had by referring to FIGS. 14 and 15, wherein there is illustrated a flush mounted rim-radiating lens adapting the principles of the present invention. In this instance the contoured lens 81 is mounted below the ground plane 87 with the shield 84 being coplanar with the ground plane 87. In practice, the ground plane 87 is a portion of the surface structure of the craft and the contoured lens would be adapted to a cavity therein.

It is taught by the above equations that the index of refraction may be derived for a general lens contour when the beam angle, feed radius and contour are specified; or the contour may be derived if the index, beam angle and feed radius are specified. Therefore, if a beam width of a certain angle is desired, the contour of the lens may be varied, or the point of feed with respect to the radius may be varied. Alternatively, the dielectric constant of the material comprising the lens may be varied.

In a practical consideration of the invention, when a given beam angle is specified the index of refraction for the given beam angle may be obtained through varying the spacing between plates 13 and 10 of the embodiment shown in FIGS. 8 and 9. The variations in spacing is in accordance with the graph of FIG. 13 and Equation 58. Another physical means for varying the index of refraction by varying the dielectric constant of the surface wave structure may be had by varying the post size and spacing in a metal post surface-wave antennna. The metal post structures (as described by H. B. Querido, "Surface Wave Fields and Phase Velocity Variations of Grounded Dielectric Sheets and of Periodic Structures of Metal Posts on a Ground Plane," The Ohio State University Research Foundation, Report No. 667–46, November 1958) may be considered as sheets of artificial dielectric. Such structures will support the dominant TM surface-wave mode. The index of refraction of these structures depends on the post size and spacing and their height. Still another physical means of varying the index of refraction would be through the use of a pliable dielectric material. This may be accomplished either with an inflatable material type of lens or by the use of plasmas as the dielectric.

Alternatively, the index of refraction may be varied electrically as well as physically. The lens for instance may comprise a ferromagnetic material and the applied magnetic field may be varied to control the index of refraction. Again the lens may comprise a ferroelectric material and the applied potential across the plates may be varied to control the index of refraction. Again the lens may comprise a ferroelectric material and the applied potential across the plates may be varied to control the index.

It was also pointed out above that the present invention adapts itself readily as a vertical beam scanning antenna. One skilled in the art could adapt conventional power driven cams, screws or other movable reciprocating means to the antenna structure shown for physically and continuously varying the index of refraction to thereby cause the beam to scan in an up and down direction. With reference to FIGURE 16, there is illustrated simplified means for varying the spacing between plates 13 and 14. Dielectric screws 23 have their upper end secured to the underside of plate 13 and their side to a reduction gear 24 and then to a reciprocating motor 25 for rotation fore and aft. In this way plate 13 is moved up and down. Alternately rod 61 of FIG. 20*b*—also of dielectric material—may be substituted for the screw 23, the other end of the rod being linked to a cam that is motor driven. Other means for varying the spacing between plates 13 and 14 will be apparent and the arrangement shown in FIGURE 16 is equally adaptable to the cap type of lens shown in FIGURE 8 or the parallel plate structure of FIGURE 2.

The feed position variation means for varying the beam angle is illustrated in FIGURES 19 and 19*a*. In this embodiment the contoured plate 87*a* has an elongated slot 83 therein. Slidably covering this slot is plate 84 having the feed 82 centrally positioned therewith and opening into the lens 81 through the slot 83. As shown in FIGURE 19*b*, a rack 85 fixedly positioned to plate 84 or alternatively to feed 83 and pinion 86 driven by reciprocating motor 87 will continuously move the feed 82 back and forth. Rack 85 is shown in FIGURE 19*b* in a vertical position whereas plate 84 and hence the movement of the feed 83 is shown horizontally in FIGURE 19*a*. It would, of course, be a simple mechanical expediency for arranging the rack 85 and plate 84 to permit movement of plate 84 in the direction of the longitudinal axis of the antenna. That is, the plate 84 is moved to and fro from the rim of the antenna. In this way the feed 83 entering the center of the plate 84 will vary its feed position to a position between the rim and center of the antenna. As set forth hereintofore, the variation of the feed position causes a variation in the radiated beam angle.

Or again in the ferromagnetic or ferroelectric material type of lenses, simple means for continually varying back and forth either the magnetic or electric field is available. With reference to FIGURE 17, there is illustrated a manner of varying the electric field across the ferroelectric material comprising the lens. A pair of leads 93 and 94 are connected to the upper and lower plates of the lens. A source 92 of voltage is connected to the plates through the leads 93 and 94. A potentiometer 91 is intermediate the one lead and has a tap 91*a* for varying the voltage to the lens. A small motor 94 connected to the tap 91*a* through a linkage will continually vary the voltage applied to the plates. The motor 94 can be reciprocating or alternately, the potentiometer 91 can be of the continuous tap rotation type.

With reference to FIGURE 18, a coil 71 for producing a magnetic field surrounds the lens 81. Again, the voltage applied to coil 71 for varying the magnetic field is similar to that of FIGURE 17.

In FIGURES 20, 20*a*, and 20*b*, there is shown a metal post surface-wave structure. FIGURE 20 illustrates the square type of post 63 whereas FIGURE 20*a* illustrates the circular post 64. The post height is shown to be varied by threaded rotation of the circular posts 61 through the sheet 62. Again, a motor driven arrangement as shown in FIGURE 20*b*, for varying the heights of the respective posts relative to one another and thereby vary the over-all contour of the antenna similar to that of FIGURE 16, is provided for continuous scan of the radiated beam. The spacing of the posts 63, 64 may be varied in position in an apertured sheet 62.

Finally, the plates 13 and 14 such as shown in FIGURE 16 may comprise an air tight chamber with the spacing therebetween maintained by compression. A compressor—in lieu of the motor and screw type of drive—having a variable compression outlet will, in turn, vary the spacing between plates 13 and 14. Placing the general plane of the lens in the vertical and scanning the beam in the horizontal would be within the teachings of this invention.

Although we have shown certain and specific embodiments, it is to be understood that modifications thereto may be had without departing from the spirit and scope of the invention.

What is claimed is:

1. A Luneberg lens antenna system comprising a surface-wave structure, a radially symmetrical dielectric lens having a rim positioned on and integrally formed with said structure, the contour configuration of said lens conforming to that of said surface wave structure, means for feeding electromagnetic energy at a radial point between the rim and the center of said lens, said energy radiating from the rim of said lens at the diametrically opposite end of said lens with respect to said feed and the beam angle of said radiant energy being a function of the index of refraction of said lens, said contour configuration and said radial point of feed; and means for varying said index of refraction of said lens to vary said beam angle.

2. A Luneberg lens antenna system comprising a surface-wave structure, a radially symmetrical dielectric lens having a rim positioned on and integrally formed with said structure, the contour configuration of said lens conforming to that of said surface-wave structure, means for feeding electromagnetic energy at a radial point between the rim and the center of said lens, said energy radiating from the rim of said lens at the diametrically opposite end of said lens with respect to said feed and the beam angle of said radiant energy being a function of the index of refraction of said lens, said contour configuration and said radial point of feed; and means for varying said radial point of feed of said lens to vary said beam angle.

3. A Luneberg lens antenna system comprising a surface-wave structure, a radially symmetrical dielectric lens having a rim positioned on and integrally formed with said structure, the contour configuration of said lens conforming to that of said surface-wave structure, means for feeding electromagnetic energy at a radial point between the rim and the center of said lens, said energy radiating from the rim of said lens at the diametrically opposite end of said lens with respect to said feed and the beam angle of said radiant energy being a function of the index of refraction of said lens, said contour configuration and said radial point of feed; and means for varying the dielectric constant of said lens to vary said beam angle.

4. A Luneberg lens antenna system as set forth in claim 1, wherein said lens comprises a ferromagnetic material, and said means for varying said index of refraction is a magnetic field.

5. A Luneberg lens antenna system as set forth in claim 1, wherein said lens comprises a ferroelectric material, and said means for varying said index of refraction is an electrical field.

6. A Luneberg lens antenna system comprising a surface-wave structure, a radially symmetrical dielectric lens having a rim positioned on and integrally formed with said structure, the contour configuration of said lens conforming to that of said surface wave structure, means for feeding electromagnetic energy at the radial point between the rim and the center of said lens, said energy radiating from the rim of said lens at the diametrically opposite end of said lens with respect to said feed and the beam angle of said radiant energy being a function of the index of refraction of said lens, said contour configuration and said radial point of feed, said surface-wave structure being further defined as having a depression therein and said lens being integrally formed in said depression; and a shield having a diameter slightly less than said depression positioned over said depression and in a plane with said surface-wave structure.

References Cited by the Examiner

UNITED STATES PATENTS

| | | | |
|---|---|---|---|
| 2,576,181 | 11/1951 | Iams | 343—911 |
| 2,624,003 | 12/1952 | Iams | 343—785 X |
| 2,720,588 | 10/1955 | Jones | 343—911 |
| 2,814,037 | 11/1957 | Warren et al. | 343—754 |
| 2,822,542 | 2/1958 | Butterfield | 343—785 |
| 2,921,308 | 1/1960 | Hansen et al. | 343—754 |
| 3,005,983 | 10/1961 | Chandler | 343—753 |
| 3,067,420 | 12/1962 | Jones et al. | 343—754 |
| 3,086,205 | 4/1963 | Berkowitz | 343—754 |

FOREIGN PATENTS

| | | |
|---|---|---|
| 688,374 | 3/1953 | Great Britain. |

OTHER REFERENCES

An Extension of the Luneberg-Type Lenses, J. E. Eaton, NRL Report 4110, Feb. 16, 1953, pp. 1–4 relied on.

ELI LIEBERMAN, *Acting Primary Examiner.*